United States Patent
Retaureau et al.

(10) Patent No.: US 12,212,659 B2
(45) Date of Patent: Jan. 28, 2025

(54) PRIVATE KEY CLOUD STORAGE

(71) Applicant: NAGRAVISION SARL, Cheseaux-sur-Lausanne (CH)

(72) Inventors: Hervé Retaureau, Cheseaux-sur-Lausanne (CH); Antony Celletti, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 388 days.

(21) Appl. No.: 17/295,049

(22) PCT Filed: Nov. 22, 2019

(86) PCT No.: PCT/EP2019/082309
§ 371 (c)(1),
(2) Date: May 19, 2021

(87) PCT Pub. No.: WO2020/104686
PCT Pub. Date: May 28, 2020

(65) Prior Publication Data
US 2022/0014358 A1      Jan. 13, 2022

(30) Foreign Application Priority Data
Nov. 23, 2018   (EP) ..................................... 18208108

(51) Int. Cl.
H04L 9/08      (2006.01)
(52) U.S. Cl.
CPC ............ H04L 9/0825 (2013.01); H04L 9/085 (2013.01); H04L 9/0894 (2013.01)

(58) Field of Classification Search
CPC ..... H04L 9/0825; H04L 9/085; H04L 9/0894; H04L 9/0897; H04L 63/06; H04L 63/0442; H04W 12/04
See application file for complete search history.

(56) References Cited

U.S. PATENT DOCUMENTS

| | | | |
|---|---|---|---|
| 9,350,536 B2 | 5/2016 | Sabin | |
| 10,157,290 B1 * | 12/2018 | Sinha | H04L 63/1408 |
| 10,938,560 B2 * | 3/2021 | Thom | H04L 63/061 |
| 2012/0173885 A1 | 7/2012 | Acar et al. | |

(Continued)

OTHER PUBLICATIONS

"Trusted Execution Environment (TEE) 101: A Primer", Version 1.0 (C) Apr. 2018 Secure Technology Alliance (pp. 1-24) https://www.securetechalliance.org/wp-content/uploads/TEE-101-White-Paper-FINAL2-April-2018.pdf (Year: 2018).*

(Continued)

*Primary Examiner* — Joseph P Hirl
*Assistant Examiner* — Thomas A Gyorfi
(74) *Attorney, Agent, or Firm* — POLSINELLI LLP

(57) ABSTRACT

A system (1) for asymmetrical cryptography, comprising a device (10) and a network storage (30), wherein the device is communicatively connected to the network storage, wherein the network storage is configured to store a private key, wherein the device is configured to retrieve the private key from the network storage to perform a cryptographic operation using the private key in a secure execution environment (12) of the device, and wherein the secure execution environment is configured to only temporarily store the private key for the cryptographic operation.

16 Claims, 4 Drawing Sheets

(56) References Cited

U.S. PATENT DOCUMENTS

2018/0212769 A1* 7/2018 Novak .................... G06F 21/53
2018/0341937 A1* 11/2018 Kim ................... G06Q 20/3829

OTHER PUBLICATIONS

M. Sabt, M. Achemlal and A. Bouabdallah, "Trusted Execution Environment: What It is, and What It is Not," 2015 IEEE Trustcom/BigDataSE/ISPA, Helsinki, Finland, 2015, pp. 57-64 (Year: 2015).*

* cited by examiner

PRIVATE KEY CLOUD STORAGE

TECHNICAL FIELD

The present disclosure relates to a system for asymmetrical cryptography, a device for use in a system for asymmetrical cryptography, a network storage for use in a system for asymmetrical cryptography, and a computer-implemented method for asymmetrical cryptography.

BACKGROUND ART

In asymmetrical cryptographic systems, private keys are usually stored and used in a secure execution environment like TPM, smartcard, secured file system (iOS/Android key store), trusted execution environment, etcetera. Private keys are typically bound to the hosting device, making the cryptographic operations prone to potential problems. For example, in case the device is lost or stolen, all bound private keys stored in the secure execution environment of the device are lost as well. Also, failure of the device results in loss or unavailability of the private keys resulting for example in the inability to sign documents/transactions or the inability to authenticate related services like banking services.

In known systems, loss of theft of the device typically results in high infrastructure costs for private keys loss management and revocation procedures, for example managing credit card revocation and replacement, IT authentication services provisioning, or recovery and reconfiguration of replacement secure execution environment.

In crypto-currency systems, loss or theft of private keys generally means definitive loss of money. For example, theft or loss of bitcoin private keys usually results in definitive loss of Bitcoin credits and savings.

There is a need for an improved cryptographic mechanism based on asymmetric key pair and protecting private key operations.

SUMMARY

The present disclosure applies to a cryptographic mechanism based on asymmetric key pair achieving an innovative way of protecting private key operations. It is based on an innovative network storage usage. It can apply to, but is not limited to, Blockchain, technology as well as secure authentication schemes like Fast IDentity Online (FIDO) and Internet of Things (IoT) object management.

According to an aspect of the present disclosure, a system is proposed for asymmetrical cryptography. The system can comprise a device and a network storage. The device can be communicatively connected to the network storage. The network storage can be configured to store a private key. The device can be configured to retrieve the private key from the network storage to perform a cryptographic operation using the private key in a secure execution environment of the device. The secure execution environment can be configured to temporarily store the private key for the cryptographic operation. E.g., the private key may be deleted from memory when the cryptographic function has finished.

In an embodiment the private key can be stored in the network storage as an encrypted private key. The encrypted private key can comprise the private key encrypted using a customer secret. The device can be configured to retrieve the encrypted private key from the network storage. The device can be configured to obtain the customer secret. The secure execution environment can be configured to decrypt the encrypted private key using the customer secret to obtain the private key.

In an embodiment the device can be configured to set up a first secure link for transmission of the customer secret between a software application running on the device and the secure execution environment.

In an embodiment the secure execution environment can be configured to provide a result of the cryptographic operation to the software application via the first secure link.

In an embodiment the device can be configured to set up a second secure link for transmission of the private key between the network storage and the secure execution environment.

In an embodiment the secure execution environment can be configured to create an asymmetrical key pair comprising the private key. The secure execution environment can be configured to temporarily store the created private key until stored in the network storage. The device can be configured to transmit the created private key to the network storage for storing the private key.

In an embodiment the secure execution environment can be configured to encrypt the private key using the customer secret before transmission to the network storage.

According to an aspect of the disclosure, a device is proposed for use in a system for asymmetrical cryptography having one or more of the above described features. The device can be communicatively connected to a network storage configured to store a private key. The device can be configured to retrieve the private key from the network storage to perform a cryptographic operation using the private key in a secure execution environment of the device. The secure execution environment can be configured to temporarily store the private key for the cryptographic operation. E.g., the private key may be deleted from memory when the cryptographic function has finished.

According to an aspect of the invention, a network storage is proposed for use in a system for asymmetrical cryptography having one or more of the above described features. The network storage can be communicatively connected to a device. The network storage can be configured to store a private key. The network storage can be further configured to transmit the secure execution environment of the device for a cryptographic operation using the private key.

According to an aspect of the invention a computer-implemented method is proposed for asymmetrical cryptography in a system having one or more of the above described features. The system can comprise a device and a network storage. The device can be communicatively connected to the network storage. The network storage can be configured to store a private key. The method can comprise retrieving the private key from the network storage in the device to perform a cryptographic operation using the private key in a secure execution environment of the device. The method can further comprise temporarily storing the private key in the secure execution environment for the cryptographic operation. E.g., the private key may be deleted from memory when the cryptographic function has finished.

In an embodiment the private key can be stored in the network storage as an encrypted private key, wherein the encrypted private key comprises the private key encrypted using a customer secret. The method can comprise retrieving the encrypted private key from the network storage in the device. The method can further comprise obtaining the customer secret in the device. The method can further comprise decrypting the encrypted private key in the secure execution environment using the customer secret to obtain the private key.

In an embodiment the method can further comprise setting up a first secure link in the device for: transmission of the customer secret between a software application running on the device and the secure execution environment, and/or providing a result of the cryptographic operation from the secure execution environment to the software application.

In an embodiment, the method can further comprise setting up a second secure link for transmission of the private key between the network storage and the secure execution environment.

In an embodiment the method can further comprise creating an asymmetrical key pair comprising the private key in the secure execution environment. The method can further comprise temporarily storing the created private key in the secure execution environment until the private key is stored in the network storage. The method can further comprise transmitting the created private key from the device to the network storage for storing the private key.

In an embodiment the method can further comprise encrypting the private key using the customer secret in the secure execution environment before transmission to the network storage.

Advantageously, the present disclosure prevents loss of personal confidential data. In fact, the secure execution environment of a device—for example TPM, smartcard, secured file system as iOS/Android key store, trusted execution environment, etcetera—can be lost or stolen without private keys being compromised. Moreover, because there are no private keys stored in the secure execution environment, the secure execution environment can be replaced without the need for revocation or comprehensive installation, and at relatively low migration cost. Without any cryptographic keys, e.g. private keys, being stored in the secure execution environment, advantageously the same secure execution environment, e.g. token, may be provisioned to multiple or all users.

Advantageously, regarding the private keys secrecy, the network storage, which may be implemented as a cloud storage service (CSS), does not need to have direct access to the private keys value ensuring key secrecy. Cryptographic assets protecting private keys need not be managed by the cloud service.

Advantageously, the secure execution environment can be standardized and the same for any usage. There need not be any secure execution environment specific data, such as private keys stored in the secure execution environment.

Advantageously, the certification process of the secure execution environment can be less complicated: no private keys need be stored on the secure execution environment and therefore no secure storage management certification is required.

Advantageously, with the present disclosure reliable key usage monitoring analytics becomes possible since the network storage can reliably catch any key access and usage.

Hereinafter, embodiments of the disclosure will be described in further detail. It should be appreciated, however, that these embodiments may not be construed as limiting the scope of protection for the present disclosure.

BRIEF DESCRIPTION OF DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Different from known solutions, where private keys are typically stored in a secure execution environment (SEE) of a device, in the present disclosure a network storage may be involved in private key operations by storing the private keys in the network storage and providing a required private key to a SEE of a device when needed. The SEE may then be used for protection of private key operation processing without permanently storing the private key.

Examples of a SEE are TPM, smartcard, secured file system such as iOS/Android key stores, trusted execution environment (TEE), SIM, eSIM, contactless secure token, etcetera. The SEE may be implemented in hardware and/or software, and may be embedded in the device, detachably connected to the device, or communicatively connected to the device.

The network storage may be a computer data storage server that is accessible via a data network, e.g. a local area network (LAN), a wide area network (WAN), the Internet or a combination thereof. The network storage may be implemented in a cloud computing environment, e.g. implemented as a cloud storage service (CSS).

Private keys may be securely stored in the network storage by applying protection based on customer personal assets. The private keys may for example be encrypted using a customer secret known to the end-user of the device. The encrypted private keys are then stored in the network storage.

Figure 1:
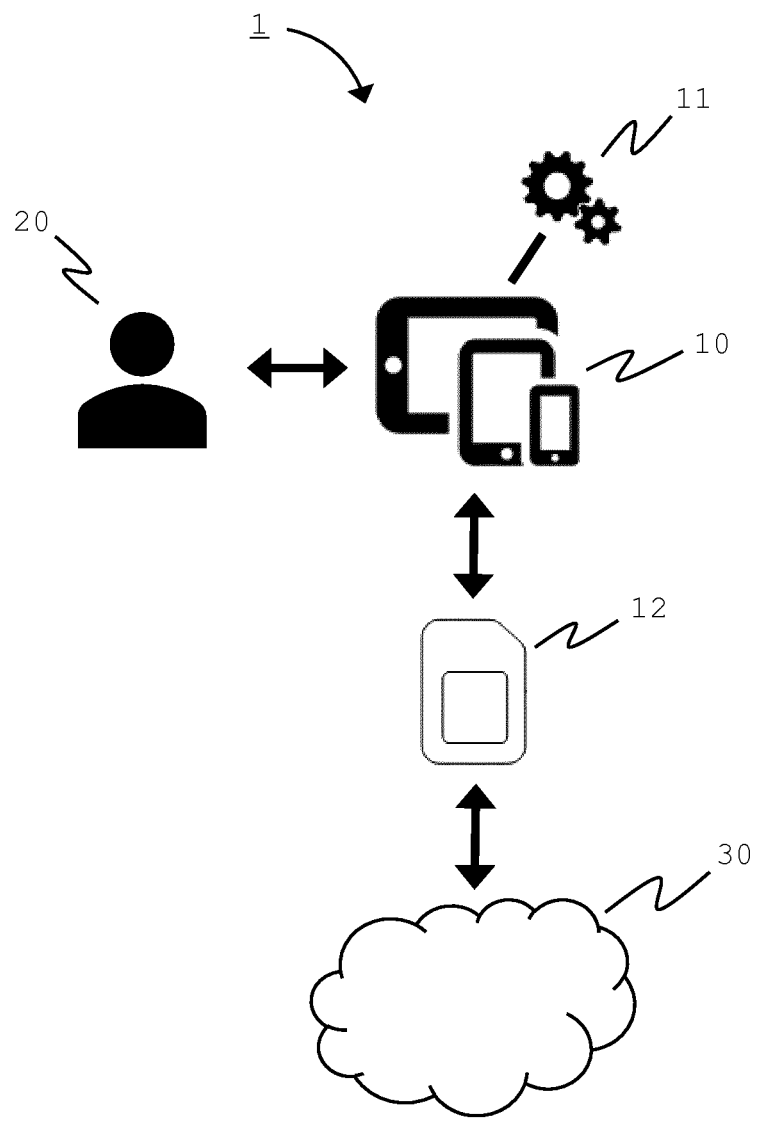
FIG. 1 shows a system of an exemplary embodiment.

FIG. 1 shows a system 1 of an exemplary embodiment. A customer device 10 is shown that can be operated by an end-user or customer 20. The device 10 may be any device with data connectivity possibilities, and typically is one of a smartphone, tablet device, notebook device, or any other portable data communication device. On the device, any application 11 may be installed or installable. The application 11 may be FIDO compliance or have embedded a proprietary Software Development Kit (SDK) for secured data operations involving cryptographic private key operations. The application 11 typically interacts with the user 20 and/or a desired service. The SEE 12 is configured to principally only temporarily store a cryptographic key, such as a private key. The SEE 12 preferably performs cryptographic operations on keys without storing the keys. Network storage 30, preferably implemented as a cloud storage or cloud storage service, may store the private keys. Preferably the private keys are stored protected with a customer secret, such as a passphrase or fingerprint of the user 20. Protected storage of the keys ensures that the keys cannot be obtained and used in case the network storage 30 would be compromised.

In the system 1 of FIG. 1, as an example, the customer 20 may want to access a web service and owns a cloud storage service (CSS) account in the cloud storage 30. The customer 20 may define an assets as for example fingerprint, specific credentials such as passphrase or pin code, account credentials, etcetera that protects application private keys used with an application 11. The application 11 may be any application operating the web or local service that is accessed by the customer 20 and requiring private key operations.

The customer's device 10 may be an untrusted device. The device 10 typically hosts and executes the application 11. The device 10 preferably establishes a local secure communication channel with the SEE 12.

The SEE may perform and secure private key operations. The SEE preferably does not store customer private and/or public keys. The SEE may be provisioned with relevant keys to perform an associated cryptographic scheme in order to establish a secure connection channel with the cloud storage service 30. The SEE may be deployed on any form factor with relevant security for example as a smartcard, wireless secured token, TPM, trusted execution environment, etcetera.

The cloud storage service (CSS) 30 may host customer accounts with related private keys. Private keys may be protected with a cryptographic scheme using customer assets for example specific credentials, account credentials, fingerprint, etcetera. CSS private key storage may be over-protected with any specific cloud protection function. CSS 30 may hold the relevant service keys used to establish a secure connection channel with the SEE. The SEE 12 may connect to the CSS 30 either with direct connectivity, for example via a TEE IP interface or using IoT networking,) if available on the SEE 12 or indirectly through device proxying.

Figure 2:
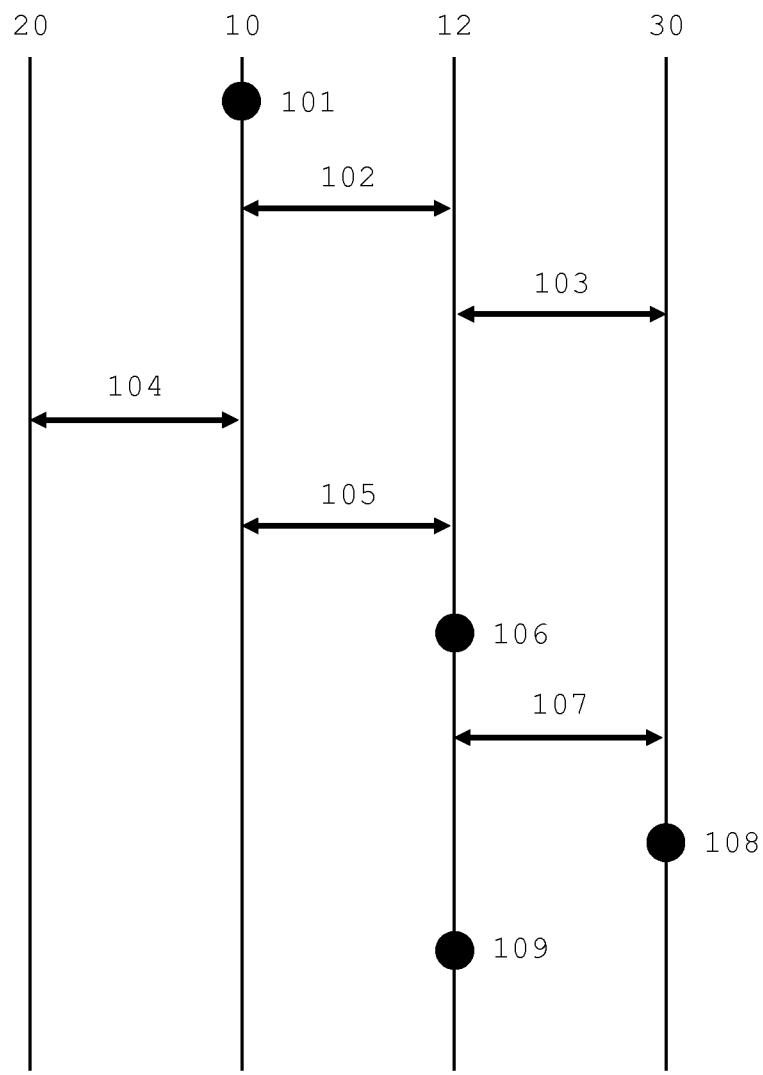
FIG. 2 shows a time sequence diagram of an exemplary private key creation method.
Figure 3:
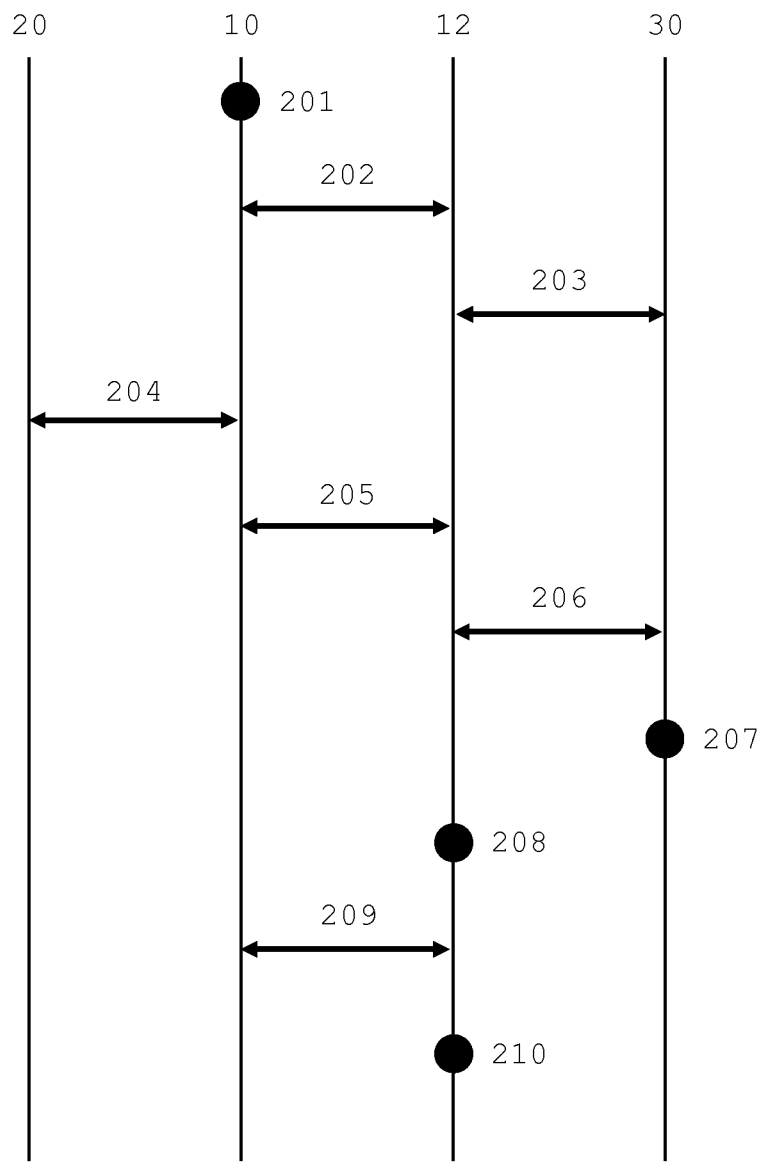
FIG. 3 shows a time sequence diagram of an exemplary private key usage method.

FIG. 2 and FIG. 3 show exemplary workflows to operate private keys in an exemplary embodiment. The vertical lines represent elements of the system 1 of FIG. 1. A black dot indicates an operation at an element. Arrows indicate a data exchange between elements.

FIG. 2 shows the following exemplary steps for creating a private key. In step 101 an application 11 triggers a key pairing operation in the device 10. In step 102 a device-token for a secure link is negotiated between the device 10 and the SEE 12. In step 103 a cloud-token for a secure link is negotiated between the SEE 12 and the cloud server 30. In step 104 the user 20 is requested a secret, such as a password, pin code, passphrase, fingerprint, etcetera, and/or user account information. The customer secret may be provided directly on the SEE 12 if the SEE has input capabilities. Typically the customer secret is provided by the user 20 via the device 10. In step 105 the device 10 sends a request for key pair creation together with the provided customer secret and/or user account information to the SEE 12. In step 106 a key pair is created in the SEE 12. In step 107 the private and public key, usually in the form of a certificate, are transmitted to the account on the cloud server 30. In step 108 the private key is securely stored in the cloud storage 30 using the customer secret to encrypt the private key. The storage may be over-protected by applying further local protection in the cloud server 30, possibly depending on the user account. In step 109 the key pair and in particular the private key is forgotten, i.e. removed from temporary memory in the SEE 12.

FIG. 3 shows the following exemplary steps for using a private key. In step 201 an application 11 required a private key operation in the device 10. In step 202 a device-token for a secure link is negotiated between the device 10 and the SEE 12. In step 203 a cloud-token for a secure link is negotiated between the SEE 12 and the cloud server 30. In step 104 the user 20 is requested the secret, such as the password, pin code, passphrase, fingerprint, etcetera, and/or user account information. The customer secret may be provided directly on the SEE 12 if the SEE has input capabilities. Typically the customer secret is provided by the user 20 via the device 10. In step 205 the device 10 sends a request for the private key operation together with the provided customer secret and/or user account information to the SEE 12. In step 206 the private and public key are requested by the SEE 12 from the cloud server 30. In step 207 the local over-protection is removed from the private key in the cloud server 30. In step 208 the private key is received in the SEE 12 and the private key operation is processed in the SEE 12. In step 209 the operation result is transmitted from the SEE 12 to the device 10 for use in the application 11, typically together with the public key or certificate. In step 210 the key pair and in particular the private key is forgotten, i.e. removed from temporary memory in the SEE 12.

In the examples of FIG. 2 and FIG. 3, a key pair may thus be securely created on the SEE 12 and provided to the CSS 30. The private key may be protected within the SEE 12 by user assets and sent to the CSS 30 through a CSS-SEE secure channel. In this example private keys are not stored on the SEE 12 and CSS 30 is not able to decrypt private keys. The CSS-SEE secure channel protects data exchange from eavesdropping.

In the examples of FIG. 2 and FIG. 3, operating private keys involves retrieving protected private keys from the CSS 30 to the SEE 12 through the CSS-SEE secure channel, unprotecting locally in the SEE 12 the private key with provided customer assets from the user 20 and performing a private key operation locally in the SEE 12. In this example the SEE cryptographic scheme ensures that no residual data remains so that private keys are no more present on the SEE 12 after operation completion.

The secure channel mechanism for the CSS-SEE secure channel may rely on robust and standardize protocols. The CSS-SEE secure channel may implement a proprietary protocol. The CSS-SEE secure channel may be based on a hardware enforcement feature.

User authentication may be combined with any advanced access control policy management system, such as multi-factor, delegation with optional limitations, etcetera.

Figure 4:
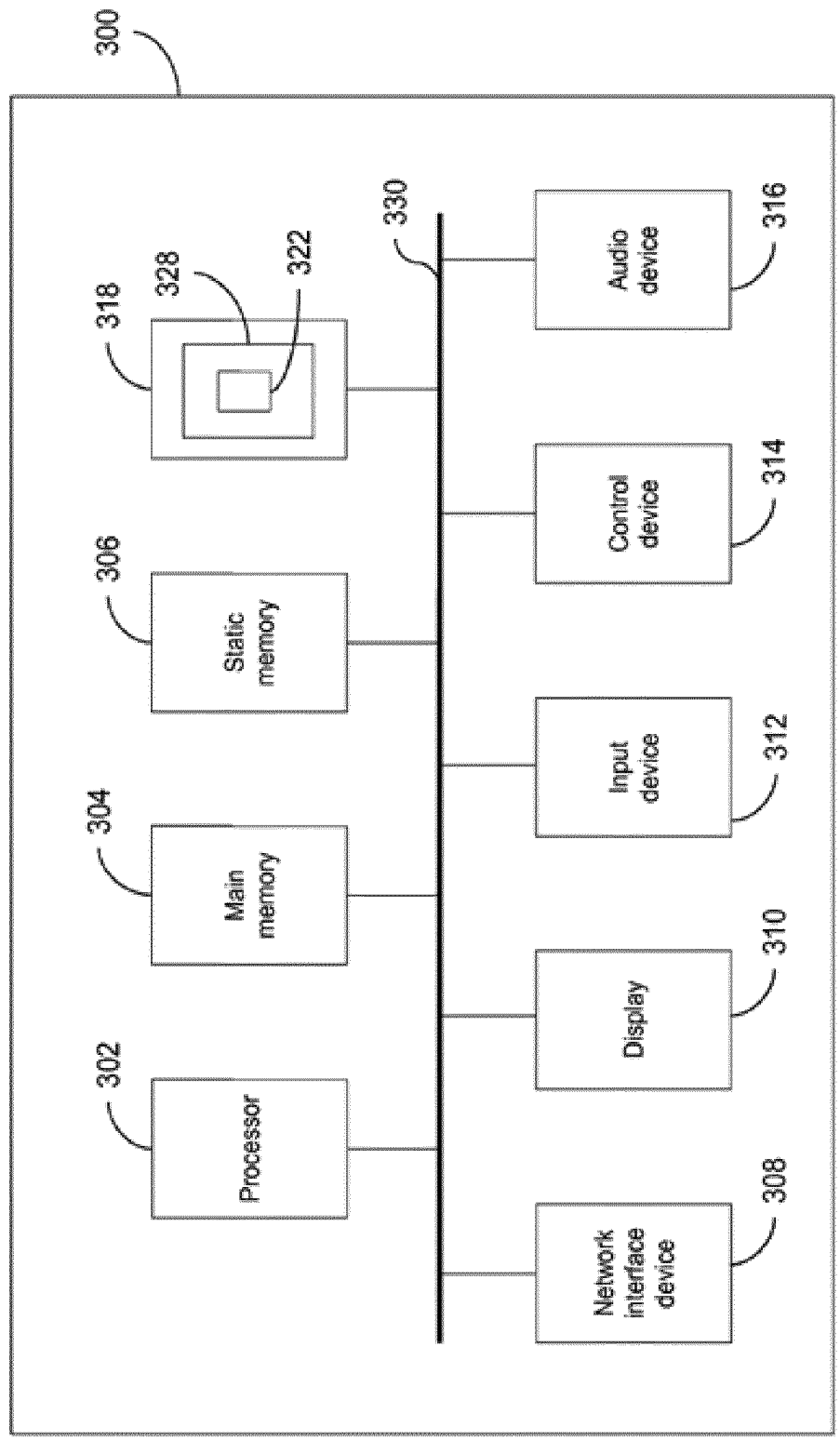
FIG. 4 shows a block diagram of one implementation of a computing device.

FIG. 4 illustrates a block diagram of one implementation of a computing device 300 within which a set of instructions, for causing the computing device to perform any one or more of the methodologies discussed herein, may be executed. The computing device 300 may be used for elements of the system shown in FIG. 1.

In alternative implementations, the computing device may be connected (e.g., networked) to other machines in a Local Area Network (LAN), an intranet, an extranet, or the Internet. The computing device may operate in the capacity of a server or a client machine in a client server network environment, or as a peer machine in a peer-to-peer (or distributed) network environment.

The computing device may be a personal computer (PC), a tablet computer, a set-top box (STB), a wearable computing device, a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory (e.g., a data storage device 318), which communicate with each other via a bus 330.

Processing device 302 represents one or more general-purpose processors such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the processing logic (instructions 322) for performing the operations and steps discussed herein.

The computing device 300 may further include a network interface device 308. The computing device 300 also may include a video display unit 310 (e.g., a liquid crystal display (LCD) or a cathode ray tube (CRT)), an alphanumeric input device 312 (e.g., a keyboard or touchscreen), a cursor control device 314 (e.g., a mouse or touchscreen), and an audio device 316 (e.g., a speaker).

The data storage device 318 may include one or more machine-readable storage media (or more specifically one or more non-transitory computer-readable storage media 328) on which is stored one or more sets of instructions 322 embodying any one or more of the methodologies or functions described herein. The instructions 322 may also reside, completely or at least partially, within the main memory 304 and/or within the processing device 302 during execution thereof by the computing device 300, the main memory 304 and the processing device 302 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein (for example control unit 310 in relation to FIG. 4) can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Thanks to the substitution of the storage of private keys in the secure environment with the network storage, and having the secure execution environment only for the protection of private key operation processing allows to prevent from loss of personal and confidential data. The private keys are stored in the cloud and then protected using end user personal assets only. Any secure execution environment, secure file system, etc, may be lost or stolen without any relevant end user and system issues. Only a new SEE need to be available but no revocation, installation or migration coast. The private keys secrecy is not compromised: the CSS does not have direct access to private keys value ensuring key secrecy, which means that cryptography assets protecting private keys are not managed by the cloud service.

The invention claimed is:

1. A system comprising:
a customer device that is communicatively connected to a network storage, wherein the network storage is configured to store an encrypted private key comprising a private key of an asymmetrical key pair that has been encrypted using a customer secret, and wherein the customer device comprises:
one or more processors;
memory accessible to the one or more processors, the memory storing instructions which, upon execution by the one or more processors, causes the one or more processors to:
retrieve the encrypted private key from the network storage; and
obtain a customer secret; and
a secure execution environment and configured to:
decrypt the encrypted private key using the customer secret to obtain the private key;
temporarily store the private key for use in a cryptographic operation;
perform the cryptographic operation using the private key;
after performing the cryptographic operation using the private key, delete the private key from a memory of the secure execution environment; and
provide a result of the cryptographic operation.

2. The system according to claim 1, wherein the instructions, upon execution by the one or more processors, further causes the one or more processors to:
configure a first secure link between the secure execution environment of the customer device and an application executing on the customer device; and
obtain the customer secret via the first secure link,
wherein the secure execution environment is configured to provide the result of the cryptographic operation to the application via the first secure link.

3. The system according to claim 1, wherein the instructions, upon execution by the one or more processors, further causes the one or more processors to:
configure a second secure link for transmission of the encrypted private key between the network storage and the customer device, and/or wherein the secure execution environment is further configured to:
create the asymmetrical key pair comprising the private key;
temporarily store the private key until stored in the network storage; and
encrypt the private key using the customer secret before transmission to the network storage,
wherein the customer device is further configured to transmit the encrypted private key to the network storage.

4. The system of claim 1, wherein the secure execution environment is embedded in the customer device.

5. The system of claim 1, wherein the secure execution environment is detachably connected to the customer device.

6. A customer device comprising:
one or more processors;
memory accessible to the one or more processors, the memory storing instructions which, upon execution by the one or more processors, causes the one or more processors to:
retrieve an encrypted private key of an asymmetrical key pair from a network storage; and
obtain a customer secret; and
a secure execution environment and configured to:
decrypt the encrypted private key using the customer secret to obtain a private key;
temporarily store the private key for use in a cryptographic operation;
perform the cryptographic operation using the private key;
after performing the cryptographic operation using the private key, delete the private key from a memory of the secure execution environment; and
provide a result of the cryptographic operation.

7. The customer device according to claim 6, wherein the instructions, upon execution by the one or more processors, further causes the one or more processors to:
configure a first secure link between a secure execution environment of the customer device and an application executing on the customer device; and
obtain the customer secret via the first secure link,
wherein the secure execution environment is configured to provide the result of the cryptographic operation to the application via the first secure link.

8. The customer device of claim 6, wherein the secure execution environment is embedded in the customer device.

9. The customer device of claim 6, wherein the secure execution environment is detachably connected to the customer device.

10. A method comprising:
storing an encrypted private key in a network storage, the encrypted private key comprising a private key of an asymmetrical key pair that has been encrypted using a customer secret;
retrieving, by a customer device, the encrypted private key from the network storage;
decrypting, by a secure execution environment of the customer device, the encrypted private key using the customer secret to obtain the private key;
temporarily storing, by the secure execution environment, the private key for use in a cryptographic operation;
performing, by the secure execution environment, the cryptographic operation using the private key;
after performing the cryptographic operation using the private key, deleting the private key from a memory of the secure execution environment; and
providing a result of the cryptographic operation.

11. The method according to claim 10, further comprising:
configuring a first secure link between the secure execution environment of the customer device and an application executing on the customer device;
obtaining the customer secret via the first secure link in the secure execution environment; and
providing the result of the cryptographic operation to the application via the first secure link.

12. The method according to claim 11, further comprising: configuring a second secure link for transmission of the private key between the network storage and the secure execution environment.

13. The method according to claim 10, further comprising:
creating the asymmetrical key pair comprising the private key in the secure execution environment;
temporarily storing the private key in the secure execution environment until stored in the network storage;
encrypting the private key in the secure execution environment using the customer secret before transmission to the network storage; and
transmit the encrypted private key from the customer device to the network storage.

14. A method comprising:
retrieving, by a customer device, an encrypted private key of an asymmetrical key pair from a network storage;
obtaining, by the customer device, a customer secret;
decrypting, by a secure execution environment of the customer device, the encrypted private key using the customer secret to obtain a private key;
temporarily storing, by the secure execution environment, the private key for use in a cryptographic operation;
performing, by the secure execution environment, the cryptographic operation using the private key;
after performing the cryptographic operation using the private key, deleting the private key from a memory of the secure execution environment; and
providing a result of the cryptographic operation.

15. The method according to claim 14, further comprising:
configuring a first secure link between a secure execution environment of the customer device and an application executing on the customer device;
obtaining the customer secret via the first secure link in the secure execution environment; and
providing the result of the cryptographic operation to the application via the first secure link.

16. The method according to claim 14, further comprising:
- creating the asymmetrical key pair comprising the private key in the secure execution environment;
- temporarily storing the private key in the secure execution environment until stored in the network storage;
- encrypting the private key in the secure execution environment using the customer secret before transmission to the network storage; and
- transmit the encrypted private key from the customer device to the network storage.

* * * * *